United States Patent
Raimann et al.

(10) Patent No.: US 7,461,632 B2
(45) Date of Patent: Dec. 9, 2008

(54) METHOD FOR OPERATING AN INTERNAL COMBUSTION ENGINE

(75) Inventors: Juergen Raimann, Weil der Stadt (DE); Guido Porten, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/890,936

(22) Filed: Aug. 6, 2007

(65) Prior Publication Data

US 2008/0053411 A1    Mar. 6, 2008

(30) Foreign Application Priority Data

Aug. 31, 2006   (DE) .................. 10 2006 040 743

(51) Int. Cl.
*F02D 41/30* (2006.01)
*F02M 51/00* (2006.01)
*G06F 19/00* (2006.01)

(52) U.S. Cl. ................ 123/431; 123/478; 701/104; 701/114

(58) Field of Classification Search ......... 701/101–105, 701/111, 114; 123/431, 478, 486, 487
See application file for complete search history.

(56) References Cited

U.S. PATENT DOCUMENTS

| 3,898,962 | A  | * | 8/1975  | Honig et al. ............ 123/488 |
| 7,013,871 | B2 | * | 3/2006  | Zhu et al. ............ 123/406.21 |
| 7,270,116 | B2 | * | 9/2007  | Pauli et al. ............ 123/480 |
| 2005/0257771 | A1 |  | 11/2005 | Nakayama et al. |

* cited by examiner

*Primary Examiner*—Willis R. Wolfe, Jr.
*Assistant Examiner*—Johnny H. Hoang
(74) *Attorney, Agent, or Firm*—Kenyon & Kenyon LLP

(57) ABSTRACT

A method for operating an internal combustion engine having a first fuel injection system for injecting fuel into a combustion chamber of a cylinder of the internal combustion engine, and having a second fuel injection system for intake manifold injection, an injected fuel mass being corrected for the adaptation of an air/fuel mixture ratio; and at least one first adaptation value for the first fuel injection system being used and at least one second adaptation value for the second fuel injection system being used. The first and the second adaptation value are evaluated in order to conclude whether there is an error in an air system of the internal combustion engine.

11 Claims, 2 Drawing Sheets

US 7,461,632 B2

METHOD FOR OPERATING AN INTERNAL COMBUSTION ENGINE

FIELD OF THE INVENTION

The present invention relates to a method for operating an internal combustion engine having a first fuel injection system for injecting fuel into a combustion chamber of a cylinder of the internal combustion engine, and having a second fuel injection system for intake manifold injection, an injected fuel mass being corrected for the adaptation of an air/fuel mixture ratio, and at least one first adaptation value for the first fuel injection system being used and at least one second adaptation value for the second fuel injection system being used.

BACKGROUND INFORMATION

A method is described, for example, in U.S. patent application Ser. No. 2005/0257771. The method provides for the use of separate adaptation values for the various fuel injection systems, in order to implement a particularly accurate activation of the fuel injection systems.

SUMMARY OF THE INVENTION

It is an object of the present invention to improve this method, to the extent that better diagnostic possibilities exist with respect to the operation of the internal combustion engine.

This object is attained according to the present invention, by evaluating the first and the second adaptation value in order to draw a conclusion on an error in an air system of the internal combustion engine.

According to the present invention, the evaluation of the adaptation values allotted to the respectively different fuel injection systems advantageously makes possible drawing a conclusion on an orderly operation of the internal combustion engine. It is recognized, according to the present invention, that the comparison of the adaptation values for the different fuel injection systems advantageously permits drawing conclusions not only on errors in a fuel system but also in an air system of the internal combustion engine.

As a result of one particularly advantageous method variant of the present invention, one may conclude on an error in the air system of the internal combustion engine if the adaptation values of the fuel injection systems each exceed a specifiable target value. The presence of an error in the air system is indicated especially accurately if the adaptation values of the various fuel injection systems all deviate in the same direction from a target value.

Furthermore, one may conclude on an error in the air system if a difference of the adaptation values of the fuel injection systems does not exceed a specifiable threshold value.

According to the present invention, a more precise regulation of the air/fuel mixture ratio of the internal combustion engine is made possible by forming a precontrol value, for a variable of the air system of the internal combustion engine, as a function of the adaptation values of the fuel injection system. By contrast to usual operating methods which, in order to influence the formation of the mixture, only have an influence on the fuel system, the operating method according to the present invention, in order to achieve that aim, makes possible an evaluation of errors in the air system and the introduction of appropriate countermeasures, by forming corresponding precontrol values for the variables of the air system.

An especially accurate diagnostic possibility is made available if the adaptation values for the fuel injection systems are ascertained in response to respectively different operating types of the internal combustion engine. For instance, one may respectively ascertain separate adaptation values for the two fuel injection systems for a part-load operation and a full-load operation.

Precise adaptation values are advantageously obtained, according to the present invention, if they are ascertained during a stationary operating state of the internal combustion engine. In an especially advantageous manner, the ascertainment of the adaptation values is carried out only when the temperature of the internal combustion engine has reached a specifiable operating temperature.

Of special meaning is the implementation of the method according to the present invention in the form of a computer program, that is stored on an electronic storage medium and can be assigned, for instance, to a control unit that controls the internal combustion engine.

DETAILED DESCRIPTION

Figure 1:
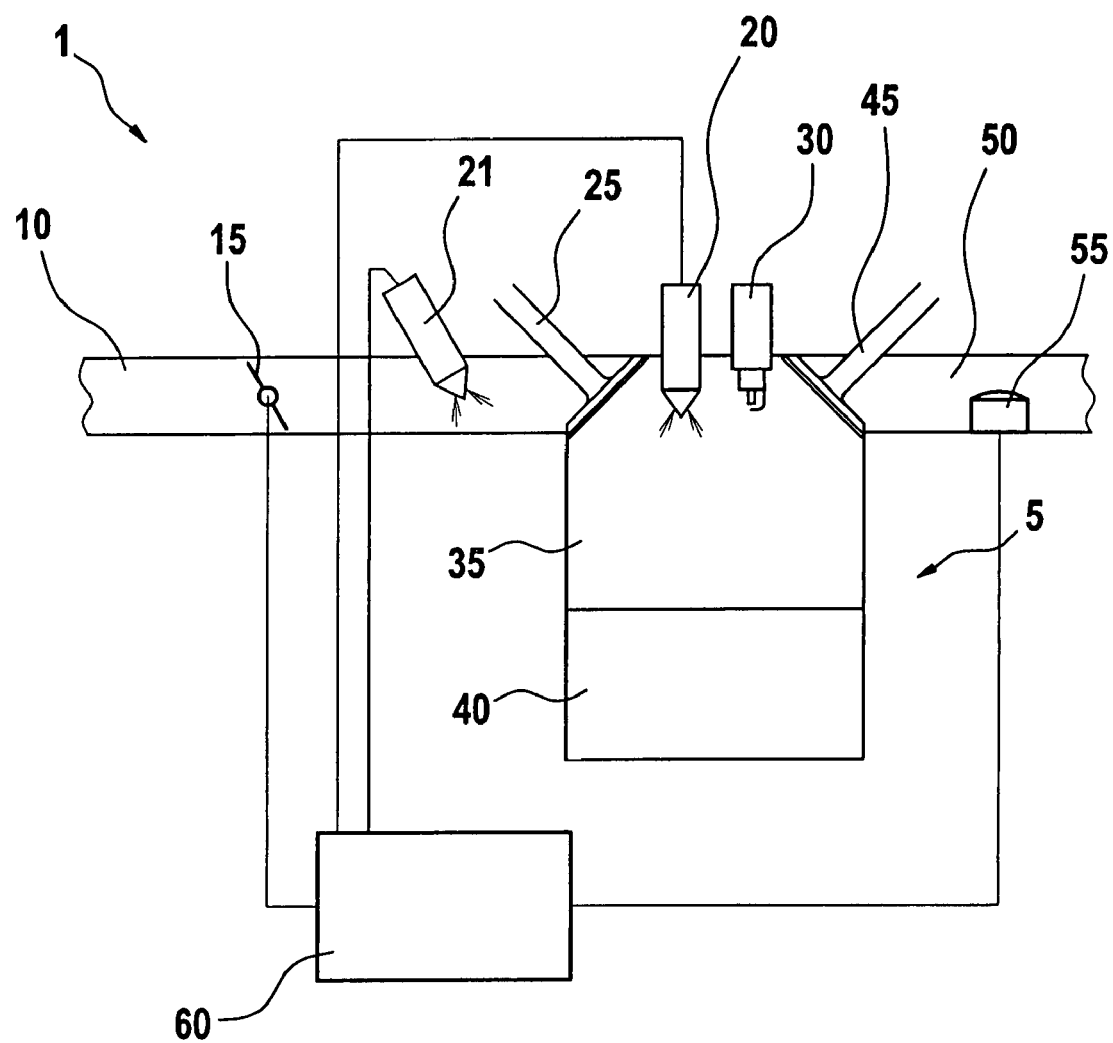
FIG. 1 shows a schematic block diagram of an internal combustion engine.

Reference numeral 1 in FIG. 1 denotes an internal combustion engine which has at least one cylinder 5 having a piston 40 and a combustion chamber 35. Fresh air is able to be supplied to combustion chamber 35 via an air supply 10, which will also be designated as intake manifold, from here on. The air mass supplied is controlled, in this instance, by the setting of a throttle valve 15 in intake manifold 10. Furthermore, combustion chamber 35 is able to be accessed or closed in the direction of intake manifold 10 via an intake valve 25.

The internal combustion engine 1 has a first fuel injection system whose fuel injector 20 is able to inject fuel directly into combustion chamber 35 of cylinder 5 of internal combustion engine 1.

Moreover, internal combustion engine 1 has a second fuel injection system, using which an intake manifold injection is implemented. A fuel injector 21 of the second fuel injection system is thus situated in intake manifold 10.

An air/fuel mixture present in combustion chamber 35 is ignited using a spark plug 30, which initiates a combustion that drives the piston. The exhaust gas created in response to the combustion of the air/fuel mixture can escape through an exhaust valve 45 and via an exhaust tract 50 of internal combustion engine 1. In exhaust tract 50 there is an oxygen sensor 55 also designated as a lambda probe, which makes possible the ascertainment of air/fuel mixture ratio $\lambda$ in exhaust tract 50.

A control unit 60 is assigned to internal combustion engine 1, illustrated in FIG. 1, and it controls, for instance, the opening angle of throttle valve 15, as well as the operation of injectors 20, 21 of the two fuel injection systems. Intake valve 25 and exhaust valve 45 can also be controlled by control unit 60 for opening and closing combustion chamber 35 in the direction of intake manifold 10 and exhaust tract 50.

Furthermore, control unit 60 controls spark plug 30 in a manner known per se, whereby the ignition firing point can be set.

For the adaptation of air/fuel mixture ratio $\lambda$ that is recorded by lambda probe 55, a corresponding adaptation value is ascertained in a manner known to one skilled in the art, whereby a precise precontrol is achievable in the regulation of the air/fuel mixture ratio λ.

A particularly precise adaptation is possible by ascertaining a separate adaptation value for each of the two fuel injection systems of internal combustion engine 1. This can be done, for example, by using a corresponding method which will be described in greater detail below, in connection with the method according to the present invention.

Figure 2:
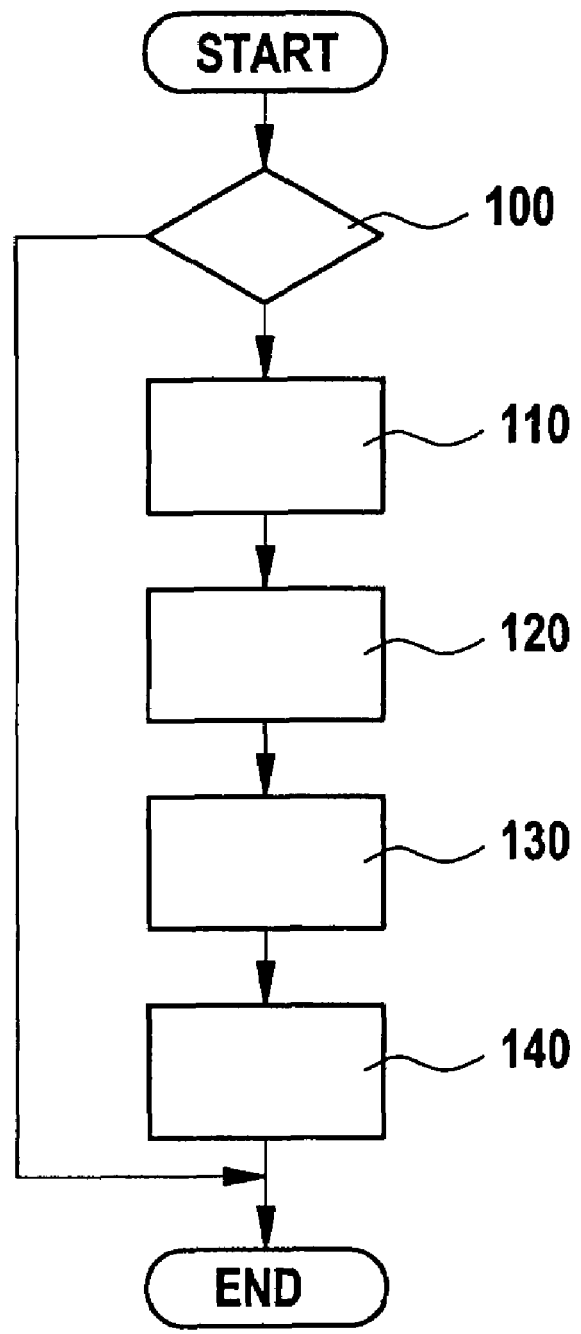
FIG. 2 shows a simplified flow chart of a specific embodiment of the method according to the present invention.

Looking at the flow chart in FIG. 2, in a first method step 100 it is first checked whether internal combustion engine 1 has assumed a stationary operating state, in order to ensure that the subsequent ascertainment of adaptation values is able to take place using adequate precision.

If the checking according to step 100 establishes that internal combustion engine 1 (FIG. 1) has a stationary operating state, in which internal combustion engine 1 has in particular reached a specifiable operating temperature, then in subsequent method step 110 an operating type of internal combustion engine 1 is set in which only the first fuel injection system is active. This means that internal combustion engine 1 is operated only using direct fuel injection into combustion chamber 35, and the intake manifold injection implemented by the second fuel injection system is deactivated. At the same time, a first adaptation value, assigned to the first fuel injection system for adaptation of an air/fuel mixture ratio, is ascertained.

Subsequently, internal combustion engine 1 is operated in a second operating type in which only the fuel injection system implementing the intake manifold injection is active, cf. step 120. By analogy to method step 110, in method step 120, as well, a separate adaptation value is ascertained for the operating type of the intake manifold injection, which is assigned to the second fuel injection system.

After that, the method according to the present invention provides, in step 130, an evaluation of the first and the second adaptation value, in order to conclude from this whether there is an error in the air system of internal combustion engine 1.

According to the present invention, it was recognized that deviations between the adaptation value of the first fuel injection system and the adaptation value of the second fuel injection system permit drawing conclusions on possible errors in an air system of internal combustion engine 1. Such errors, also designated as air system errors can occur, for example, because of tolerances of an air mass sensor that is situated, and presently not illustrated, in intake manifold 10 of internal combustion engine 1, or because of leaks in the region of intake manifold 10.

Air system errors usually lead to undesired deviations in air/fuel mixture ratio λ from a setpoint value, which are compensated for in usual methods only by the influencing, in a fuel path, of the controller that controls internal combustion engine 1. This means that, although there actually is an error in the air system of internal combustion engine 1, variables of the air system or a corresponding air path of the controller are not influenced, but rather variables such as, for instance, the fuel quantity to be injected, which also have an effect on air/fuel mixture ratio λ. By doing this, it is true that usually a desired value for air/fuel mixture ratio λ can be obtained, but the additional degree of freedom of an optional influencing of a variable of the air path and/or the fuel path does not exist.

Because of the analysis, that is introduced in step 130, of the two adaptation values assigned to the two fuel injection systems, the method according to the present invention advantageously permits, first of all, the detection of an air system error.

The method according to the present invention, quite especially advantageously, provides in addition a compensation for the detected air system error, in that a precontrol value is formed for a variable of the air system and the air path of the controller of internal combustion engine 1 as a function of the adaptation values for the fuel injection systems, cf. step 140. This means that, in contrast to usual operating methods, when an air system error occurs, the operating method according to the present invention also provides for influencing the air path by forming an appropriate precontrol value for a variable of the air system and the air path of the controller, whereby the cause of undesired deviations in the air/fuel mixture ratio is compensated for directly where the errors occur.

After the formation, according to the present invention, of the precontrol value for a variable of the air system of internal combustion engine 1, the method according to the present invention is closed, but it can be repeated if required, preferably periodically.

According to the present invention, the conclusion that there has been an error is advantageously reached when the adaptation values of the various fuel injection systems each exceed a specifiable target value.

Furthermore, it is very advantageous to conclude that there has been an air system error if the adaptation values of the different fuel injection systems each deviate from the respective target value in the same direction.

Finally, one can also advantageously check a difference of the adaptation values as to whether they exceed a specifiable threshold value, the conclusion then preferably being reached that there is an error in the air system of internal combustion engine 1 if the difference does not exceed the threshold value.

Furthermore, it can be provided, quite especially advantageously, that for different operating types of internal combustion engine 1, such as, for instance, a part-load operation or a full-load operation in each case different adaptation values are ascertained, so that for each fuel injection system of internal combustion engine 1 a corresponding set of adaptation values is obtained, each adaptation value of a set being assigned to a certain operating type of internal combustion engine 1.

Accordingly, the evaluation method and the diagnostic method according to the present invention, for the different operating types of internal combustion engine 1, can be carried out in each case while taking into consideration the appropriate adaptation values.

The method according to the present invention also permits taking into account various types of adaptation values. For instance, an adaptation value can have an additive component, which is preferably used for an adaptation in part-load operation of internal combustion engine 1, whereas a multiplicative component is preferably used for an adaptation in full-load operation of internal combustion engine 1.

What is claimed is:

1. A method for operating an internal combustion engine having a first fuel injection system for injecting fuel into a combustion chamber of a cylinder of the internal combustion engine, and having a second fuel injection system for intake manifold injection, the method comprising:
   correcting an injected fuel mass for an adaptation of an air/fuel mixture ratio; and
   evaluating at least one first adaptation value for the first fuel injection system and at least one second adaptation value for the second fuel injection system, in order to conclude whether there is an error in an air system of the internal combustion engine.

2. The method according to claim 1, wherein a conclusion that there has been an error in the air system is reached when the adaptation values of the fuel injection systems each exceed a predetermined target value.

3. The method according to claim 1, wherein a conclusion that there has been an error in the air system is reached when the adaptation values of the fuel injection systems each deviate from a target value in the same direction.

4. The method according to claim 1, wherein a conclusion that there has been an error in the air system is reached if a difference of the adaptation values of the fuel injection systems does not exceed a predetermined threshold value.

5. The method according to claim 1, further comprising forming a precontrol value for a variable of the air system of the internal combustion engine as a function of the adaptation values of the fuel injection systems.

6. The method according to claim 1, further comprising ascertaining the adaptation values for the fuel injection systems at different operating states of the internal combustion engine.

7. The method according to claim 1, further comprising ascertaining the adaptation values for the fuel injection systems in a stationary operating state of the internal combustion engine.

8. The method according to claim 7, wherein the adaptation values are first ascertained when the internal combustion engine has reached a predetermined operating temperature.

9. A computer-readable medium containing a computer program which when executed by a processor performs the following method for operating an internal combustion engine having a first fuel injection system for injecting fuel into a combustion chamber of a cylinder of the internal combustion engine, and having a second fuel injection system for intake manifold injection:
- correcting an injected fuel mass for an adaptation of an air/fuel mixture ratio; and
- evaluating at least one first adaptation value for the first fuel injection system and at least one second adaptation value for the second fuel injection system, in order to conclude whether there is an error in an air system of the internal combustion engine.

10. A control unit for an internal combustion engine for performing the following method for operating the internal combustion engine having a first fuel injection system for injecting fuel into a combustion chamber of a cylinder of the internal combustion engine, and having a second fuel injection system for intake manifold injection:
- correcting an injected fuel mass for an adaptation of an air/fuel mixture ratio; and
- evaluating at least one first adaptation value for the first fuel injection system and at least one second adaptation value for the second fuel injection system, in order to conclude whether there is an error in an air system of the internal combustion engine.

11. The control unit according to claim 10, wherein the engine is of a motor vehicle.

* * * * *